United States Patent [19]

Inciong

[11] Patent Number: 4,796,897
[45] Date of Patent: Jan. 10, 1989

[54] HEAD GASKET WITH BEAM-FUNCTIONING FIRE RING

[75] Inventor: Josefino T. Inciong, Skokie, Ill.

[73] Assignee: Fel-Pro Incorporated, Skokie, Ill.

[21] Appl. No.: 90,843

[22] Filed: Aug. 28, 1987

[51] Int. Cl.⁴ .............................................. F16J 15/06
[52] U.S. Cl. ................... 277/211; 277/235 B
[58] Field of Search ............................ 277/211, 235 B

[56] References Cited

U.S. PATENT DOCUMENTS

| | | |
|---|---|---|
| 2,307,440 | 1/1943 | Wilson . |
| 3,565,449 | 2/1971 | Ascencio . |
| 4,121,846 | 10/1978 | Skrycki ..................... 277/235 B X |
| 4,196,913 | 4/1980 | Oka ................................... 277/235 B |
| 4,312,512 | 1/1982 | Conte et al. . |
| 4,351,534 | 9/1982 | McDowell .................... 277/235 B |
| 4,518,168 | 5/1985 | Belter ............................. 277/235 B |

FOREIGN PATENT DOCUMENTS

| | | | |
|---|---|---|---|
| 814977 | 9/1951 | Fed. Rep. of Germany ...... 277/211 |
| 553 | 1/1984 | Japan ................................. 277/235 B |
| 2092244 | 8/1982 | United Kingdom ............ 277/235 B |

Primary Examiner—Allan N. Shoap
Attorney, Agent, or Firm—Dressler, Goldsmith, Shore, Sutker & Milnamow, Ltd.

[57] ABSTRACT

A head gasket having a beam functioning fire ring in the combustion opening and having a bead overlying a recess, the recess having a width at least twice as great as the width of the bead, the height of the bead being no greater than the height of the recess and preferably no more than 60% of the height of the recess. The fire ring may be a separate annulus disposed in the combustion opening and have a pair of spaced feet straddling and defining the recess.

12 Claims, 2 Drawing Sheets

4,796,897

HEAD GASKET WITH BEAM-FUNCTIONING FIRE RING

BACKGROUND OF THE INVENTION

This invention is related to a sealing means for an internal combustion engine, and in particular to an improved sealing means for the combustion cylinder of such an engine.

A wide variety of head gaskets and fire rings are known. However, there remains a problem of effective sealing, especially where an engine from time to time fails to receive uniformly the requisite coolant. In such instances a so-called "thermal push" may occur, i.e., an improperly cooled zone of the engine, such as the head, will "grow" as a result of overheating, and will then excessively compress the sealing means, such as a fire ring. Usually the gasket will seal effectively under excessive compressive loads. However when the engine cools down, the opposite of thermal push occurs and the sealing effect of the gasket in the excessively compressed areas will be lost. Upon reuse of the engine, the area which has been excessively compressed will not seal until that area again becomes overheated. Sometimes the specific area may not become overheated in the same way. In either instance, the gasket will not properly seal and this may result in a significant loss of compression and power, and sometimes can result in damage to, or destruction of, the engine itself.

Various approaches to solving the problem have been attempted. Thus, strategically located metal shims have been used. However that requires adjuncts and does not guarantee that they will always necessarily be located where a thermal push may possibly occur. Another solution has been the use of a metallic plate head gasket with embossments around the combusion openings. Metallic plates, however, bring with them other problems of sealing, including the necessity for adjuncts, such as grommets and the like, around coolant openings and the like.

Still another suggested solution would be the use of embossed ring in place of a typical armored fire ring. Such a ring could employ a typically embossed metallic annulus, either with conventional embossing (as illustrated in U.S. Pat. No. 4,312,512), or with shear embossing. The size and shape of the bead on one side and the recess on the other, are typically about the same in prior art embossments. Neither of these effectively and efficiently solve the thermal push problem.

It would be desirable to be able to use more conventional laminated head gaskets using fiber-elastomer facings, and of the general type illustrated in Ascencio U.S. Pat. No. 3,565,449, and to provide fire rings for use therewith which accomodate to and solve the thermal push problem.

SUMMARY OF THE INVENTION

In accordance with the present invention a gasket assembly comprising a main gasket body having upper and lower main surfaces adapted to be disposed between the head and block of an internal combustion engine, and defining a plurality of openings, including at least one combustion opening, fluid openings and bolt holes, and a beam functioning fire ring in each combustion opening are provided.

The beam functioning fire ring comprises, in vertical cross-section, a beam, a bead projecting from the beam in a first direction and support feet projecting from the beam in the opposite direction. The feet straddle and define a recess therebetween. The vertical projection of the bead lies within the recess and is offset inwardly of the recess from the vertical projection of each foot by a distance equal to at least one half of the width of the bead.

The bead height is no greater than the height of the recess, and preferably is no more than 80% of the height of the recess. Desirably the recess width is at least three times the width of the bead.

In use, the beam functioning fire ring defines a loading curve which progressively first functions under load as a beam, next is elastically loaded under a relative low load, and thereafter is plasticly deformed under a higher load.

In a preferred form of the invention the beam functioning fire ring is an annulus positioned in the combustion opening, and the main gasket body comprises a central core and a pair of outer fiber-elastomer facings providing upper and lower main sealing surfaces.

Further objects, features and advantages of the present invention will become apparent from the following description and drawings.

DESCRIPTION OF A PRESENTLY PREFERRED EMBODIMENT

Figure 1:
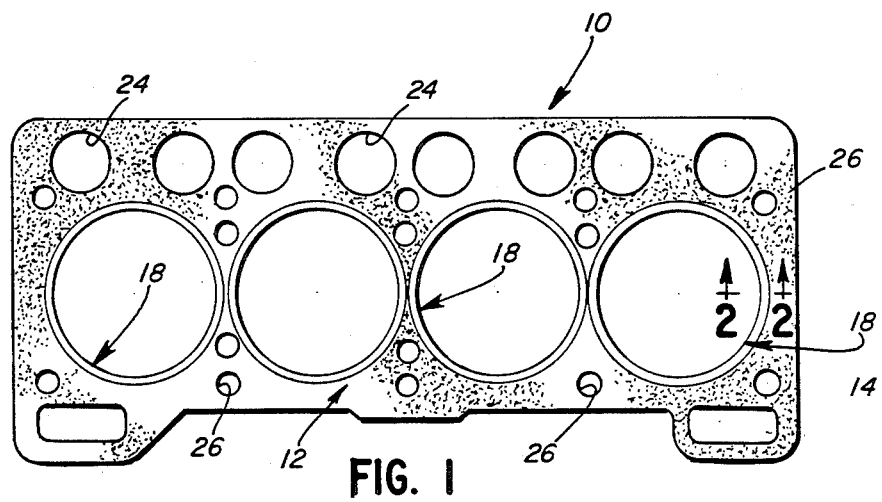
FIG. 1 is a plan view of a head gasket assembly in accordance with the present invention.

Referring now to the drawings, FIG. 1 illustrates a typical head gasket assembly with which the beam functioning embossed fire ring of the present invention may be employed. Thus head gasket 10 comprises a main gasket body 12 having two main surfaces, upper and lower main surfaces 14, 16, and a plurality of combustion openings 18 which are armored in accordance with the present invention.

Main gasket body 12 is formed of a plurality of laminated layers, such as a metallic central core 20 and a pair of outer fiber-elastomer facing layers 22 which provide the upper and lower main surfaces 14, 16.

Fiber-elastomer facing layers may comprise asbestos or glass fibers or other fibrous material and may utilize nitrile, neoprene, or polyacrylic elastomers as a binder. Fillers and other ingredients may also be present. Other flat gasket bodies may be used as well, such as, for example, cold rolled steel, among others.

The dimensions and materials of the main gasket body may vary, as may be the adjuncts and sealing aids used therewith. The metallic core 20 may be unperforated and of cold rolled steel and the facings 22 are preferably moisture, water and oil resistant. The core and facings are preferably laminated to each other in a known manner, as with a conventional adhesive.

Gasket 10 defines a plurality of suitable openings, such as fluid (oil and water) openings 24, as well as a plurality of bolt holes 26 for the purposes described in U.S. Pat. 3,565,449. The water and oil openings 24 extend through the main gasket body and are intended to provide passageways through the gasket assembly 10. However, they are to be sealed so that water and/or oil will not spread beyond the openings 24.

To that end, sealing means are conventionally provided around openings 24. In current practice, an elastomeric bead, such a silicone bead, is frequently desposited therearound, as by a silk-screening process, to form a sealing bead, usually one on each main surface 14, 16 in vertical alignment.

Figure 2:
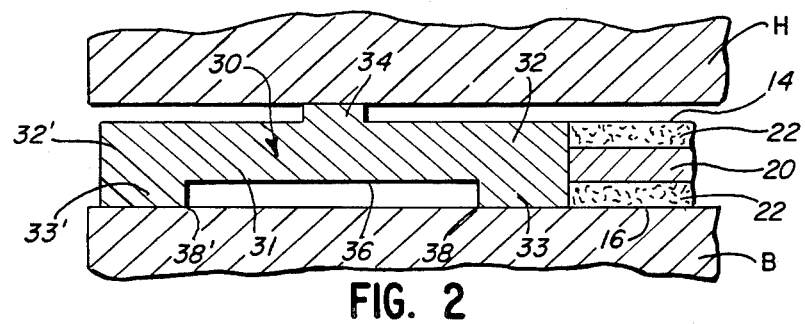
FIG. 2 is an enlarged cross-sectional view of the fire ring portion of the gasket of FIG. 1 taken substantially alone line 2—2 of FIG. 1, and showing same juxtaposed with an internal combustion engine.

In accordance with a preferred embodiment of the present invention the beam functioning fire ring may be an annulus 30 positioned and disposed in the gasket combustion opening and in vertical transverse cross-section comprises a beam section 31, a pair of perimetric inside and outside support rims 32, 32' having feet 33, 33' projecting from one side of the annulus in a first direction and a control bead 34 projecting from the other side of the annulus in a second direction. A recess 36 extends between the support rims and below the bead. As seen in FIG. 2, the recess extends laterally by a distance of at least half of the width of the vertical projection of the bead, beyond the bead on each side of the bead.

Figure 3:
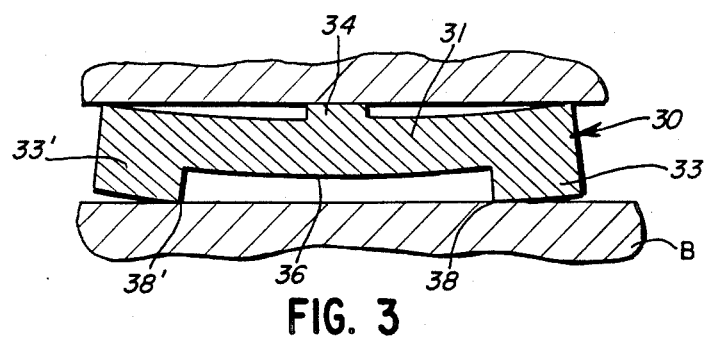
FIG. 3 is a view like FIG. 2, but of the fire ring under low load.
Figure 4:
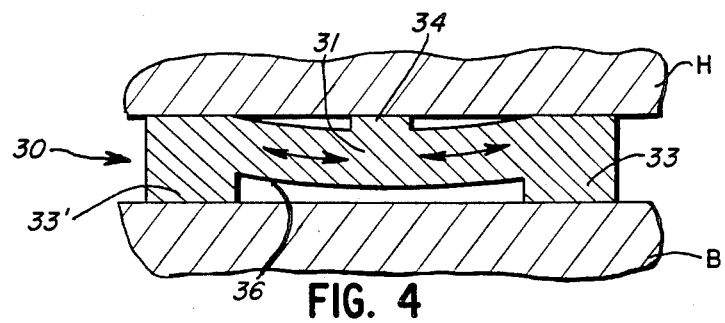
FIG. 4 is a view like FIG. 3, but of the fire ring under a higher load.
Figure 5:
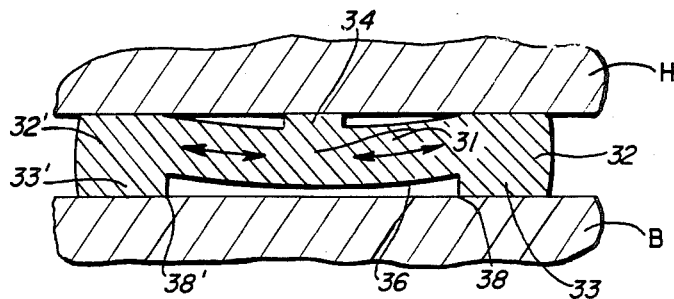
FIG. 5 is a view like FIG. 4, but of the fire ring under a still higher load.

As such, it will be apparent that the beam section 31 may be stressed and deflected from its straight or rectilinear configuration as illustrated in FIG. 2 when the bolts (not shown) passing through openings 26 and securing the head H and block B of the engine are drawn together from the position as illustrated in FIG. 2 to those positions exemplified by FIGS. 3-5, inclusive.

Figure 6:
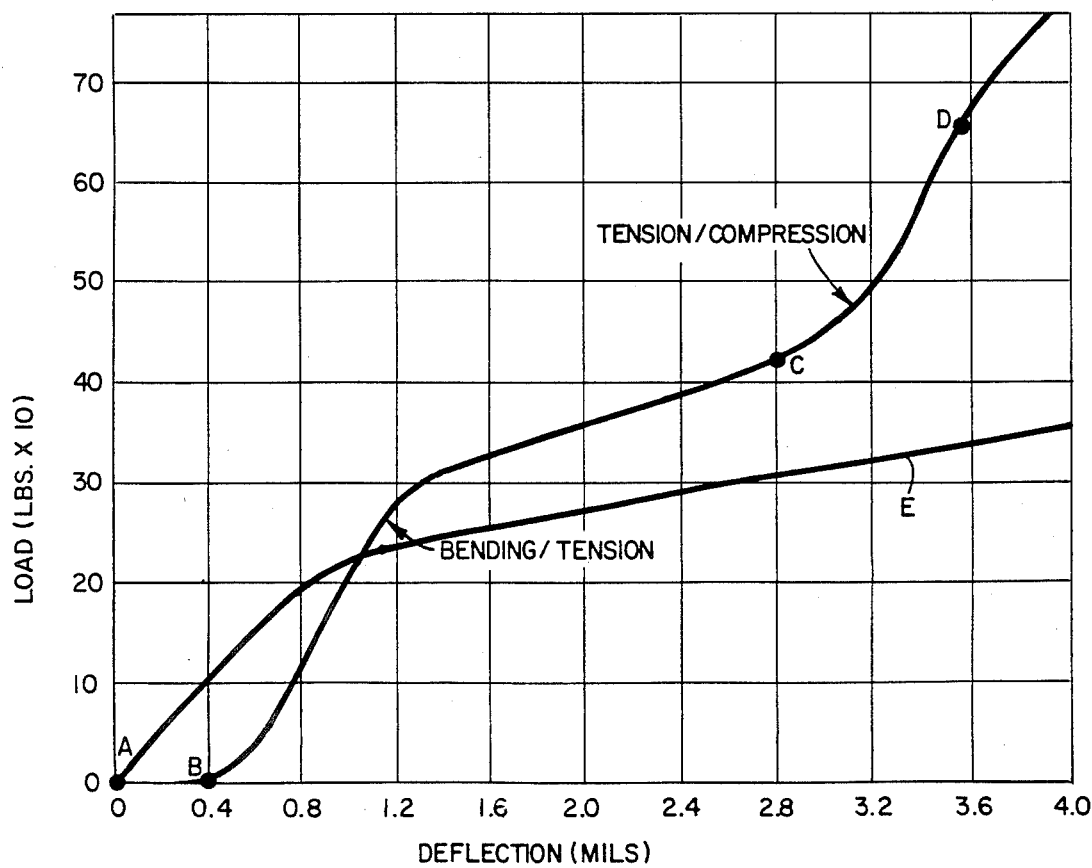
FIG. 6 is a curve showing the loading characteristics of a fire ring in accordance with the present invention.

Thus, as shown by FIGS. 2-5 and by FIG. 6 which is a typical loading curve, the fire ring of the present invention resembles, in cross-section, an end supported single point loaded beam. The control bead 34 is the loading point and the bead height provides the deflection control for the beam, as may readily be seen in the transition from FIG. 2 to FIG. 3. The inside rim 32 and outside rim 32' support the beam and the space between the feet 33, 33', the coined section or recess 36, defines the length of the beam.

When the compressive load caused by the torquing of the head and block via the bolts is applied, the bead 34 is pushed downwardly causing the beam section 31 to bend. This tends to rotate the inside corners 38, 38' of the feet 33, 33' outwardly or away from each other and to cause the top outermost corners of the fire ring to rotate relatively inwardly until they contact the head H, as illustrated in FIG. 3. During this portion of the loading, the beam section 31 bends and, as shown by section A-B of the curve (FIG. 6), the characteristics are elastic deformation at the relatively low load.

As the head H is further drawn down towards block B, the forces on the fire ring act somewhat more complexly, and require much higher loading. Thus, as further compression occurs rotation of the support rims 32, 32' for the beam, is reversed, i.e., the lower inside corners 38, 38' of the feet are rotated inwardly toward each other (and the upper outer corners of the rims are rotated relatively outwardly) causing the beam section to be tensioned, particularly in its upper zone. The behavior in moving from the position of FIG. 3 to that of FIG. 4 is a combination of tension and bending and is illustrated in curve position B-C (FIG. 6), the characteristics of which are plastic deformation and high load. The load is significantly increased to the desired load ranges of typically used metals, such as stainless steel and low carbon steel, and is the portion of the curve in which effective sealing should take place.

The stiffness of the curve can be adjusted in accordance with this invention by adjusting the length of the beam (i.e., the width of the recess) and the position of the bead along the length of the beam, as well as by adjusting the relative length of the bead versus the length of the recess (or beam).

The C-D portion of the curve (FIG. 6) is one in which the head and block act in compression against the rims (as illustrated in FIG. 5), going beyond the relationship of FIG. 4 wherein the space between the head and block was substantially the same as the height of the support rims. In this portion of the curve, the slope of the curve becomes much steeper and stiffer because the rims are absorbing all of the added load. In this zone of the curve the fire ring resists excessive bolt load and thermal push.

In deriving the curve A-D of FIG. 6, an annulus 30 of cold rolled steel was tested. Annulus 30, in a diametric transverse cross-section, was 0.15 inch wide and 0.062 inch high. The recess width was 0.067 inch with a recess depth of about 0.005. Each support rim was 0.036 inch wide by 0.062 inch high. The bead was rectangular and the width was 0.030 inch by 0.003 to 0.005 inch high. The bead was centered (in cross-sectional view) relative to the cross-sectional width of the annulus and projected upwardly therefrom. The inside diameter of the annulus was about 4.764 to 4.784 inches.

As pointed out, the curve A-D on FIG. 6 shows the behavior and loading capacity of a beam functioning embossed fire ring according to the present invention. It also shows a typical curve E schematically illustrating a load versus deflection curve encountered with a typical fire ring comprising an armor shrouding, a circular wire, and graphically illustrating the substantially improved characteristics of a beam functioning fire ring in accordance with the present invention.

The dimensions of the fire ring of the present invention may vary, taking into consideration, however, that the ring must have a portion which functions as a beam, must have a projecting bead and a significantly wider recess, and that it must define a loading curve which progressively functions first under load as a beam, next elastically under a relatively low load, and thereafter in a plastic deformation mode under a higher load.

Thus, the recess width in the annulus is at least twice the bead width and is preferably is at least three times the width of the bead. The bead height is no greater than the height of the recess and is preferably is no more than 60% of the height of the recess. The bead is spaced inwardly of the edge of the recess a distance at least equal to half the width of the bead.

It will be apparent to those skilled in the art that modifications may be made without departing from the spirit and scope of the present invention. Accordingly, the claims are intended to embrace all modifications within their scope.

What is claimed is:

1. A gasket assembly comprising an expansive main gasket body having upper and lower main surfaces adapted to be disposed between the head and block of an internal combustion engine, and defining a plurality of openings, including at least one combustion opening, fluid openings and bolt holes, and an annular beam functioning fire ring positioned and disposed in each combustion opening, said beam functioning fire ring comprising, in radial cross-section, an annular beam, an annular bead projecting from the beam in a first vertical direction and annular support feet projecting from the beam in the opposite vertical direction, said feet straddling and defining an annular recess therebetween, said bead being disposed above said recess and between said feet and being offset radially inwardly of said recess from the vertical projection of each foot by a distance equal to at least one half of the radial width of said bead.

2. The gasket assembly of claim 1, and wherein said bead height is no greater than the height of the recess.

3. The gasket assembly in accordance with claim 2, and wherein said bead height is no more than 60% of the height of the recess.

4. The gasket assembly in accordance with claim 1, and wherein said recess radial width between said feet is at least three times the radial width of the bead.

5. The gasket assembly in accordance with claim 1, and wherein said beam functioning fire ring, in use, defines a loading curve which progressively first functions under load as a beam, next is elastically loaded under a relative low load, and thereafter is placticly deformed under a higher load.

6. The gasket assembly in accordance with claim 1, wherein said expansive main gasket body comprises a central core and a pair of outer fiber-elastomer facings providing said upper and lower main surfaces.

7. The gasket assembly in accordance with claim 6, and wherein said bead height is no greater than the height of the recess.

8. The gasket assembly in accordance with claim 7, and wherein said bead height is no more than 60% of the height of the recess.

9. The gasket assembly in accordance with claim 6, and wherein said recess radial width is at least three times the radial width of the bead.

10. The gasket assembly in accordance with claim 6, and wherein said beam functioning fire ring, in use, defines a loading curve which progressively first functions under load as a beam, next is elastically loaded under a relative low load, and thereafter is plasticly deformed under a higher load.

11. A gasket assembly comprising an expansive main gasket body having upper and lower main surfaces adapted to be disposed between the head and block of an internal combustion engine, and defining a plurality of openings, including at least one combustion opening, fluid openings and bolt holes, and a beam functioning fire ring comprising an annulus positioned and disposed in each combustion opening, said beam functioning fire ring comprising, in radial cross-section, an annular beam, an annular bead projecting from the beam in a first vertical direction and annular support feet projecting from the beam in the opposite vertical direction and said feet defining an annular recess therebetween, said bead lying above said recess and between said feet and being offset radially inwardly of said recess from the vertical projection of each foot by a distance equal to at least one half of the radial width of said bead, and wherein said beam height is no more than 60% of the height of the recess, said recess radial width is at least three times the width of the bead, said beam functioning fire ring, in use, defining a loading curve which progressively first functions under load as a beam, next is elastically loaded under a relative low load, and thereafter is placticly deformed under a higher load.

12. The gasket assembly in accordance with claim 11, and wherein said main gasket body comprises a central core and a pair of outer fiber-elastomer facings providing said upper and lower main surfaces.

* * * * *

UNITED STATES PATENT AND TRADEMARK OFFICE
CERTIFICATE OF CORRECTION

PATENT NO. : 4,796,897
DATED : January 10, 1989
INVENTOR(S) : Josefino T. Inciong It is certified that error appears in the above-identified patent and that said Letters Patent is hereby corrected as shown below:

In the Claims:

Column 5, line 29, "placticly" should be --plasticly--;

Column 6, line 29, "beam" should be --bead--; and

Column 6, line 35-56, "placticly" should be --plasticly--.

Signed and Sealed this

Thirtieth Day of May, 1989

Attest:

DONALD J. QUIGG

Attesting Officer

Commissioner of Patents and Trademarks